United States Patent [19]

Laurent et al.

[11] Patent Number: 5,269,939
[45] Date of Patent: Dec. 14, 1993

[54] METHOD OF SOLIDS RECOVERY FOR USE IN ANIMAL FEED OR AS A FUEL UTILIZING NATURAL FLOCCULENTS

[76] Inventors: Edward L. Laurent; Patricia D. Laurent, both of 52 Eastfield Rd., Montgomery, Ill. 60538

[21] Appl. No.: 912,262

[22] Filed: Jul. 13, 1992

[51] Int. Cl.⁵ .............................. C02F 1/24
[52] U.S. Cl. .................... 210/705; 44/552; 71/13; 210/710; 210/727; 210/730; 210/769; 210/770; 210/905; 426/441
[58] Field of Search .................... 71/12, 13, 901; 210/710, 705, 725, 727, 728, 730, 737, 769, 770, 905; 44/552, 591; 726/641, 635, 630

[56] References Cited

U.S. PATENT DOCUMENTS

| | | | |
|---|---|---|---|
| 2,026,969 | 1/1936 | Flynn | 210/769 |
| 2,261,924 | 11/1941 | Pittman et al. | 210/737 |
| 2,328,361 | 8/1943 | Sanders | 210/710 |
| 3,297,676 | 1/1967 | Brauns et al. | 536/20 |
| 3,533,940 | 10/1970 | Penniston et al. | 210/730 |
| 3,933,634 | 1/1976 | Seki | 210/710 |
| 4,013,555 | 3/1977 | Davis | 210/725 |
| 4,368,322 | 1/1983 | Muzzarelli | 536/20 |
| 4,382,864 | 5/1983 | Hashimoto et al. | 210/727 |
| 4,411,797 | 10/1983 | Sander et al. | 210/769 |
| 4,479,879 | 10/1984 | Hashimoto et al. | 210/727 |
| 4,548,615 | 10/1985 | Lonchamp et al. | 44/6 |
| 4,609,470 | 9/1986 | Chung et al. | 210/725 |
| 4,710,298 | 12/1987 | Noda et al. | 210/505 |
| 4,744,903 | 5/1988 | McAninch et al. | 210/632 |
| 4,828,577 | 5/1989 | Markham, Jr. et al. | 44/589 |
| 4,906,386 | 3/1990 | Vasconcellos et al. | 210/727 |
| 4,933,087 | 6/1990 | Markham, Jr. et al. | 210/626 |
| 4,966,713 | 10/1990 | Keys et al. | 210/705 |
| 5,015,391 | 5/1991 | Mohn | 210/708 |

OTHER PUBLICATIONS

*Washington Post*, "Researchers Turn Crabshells Into Superior Suture Thread," Nov. 10, 1986, p. A3.

*Primary Examiner*—Peter A. Hruskoci
*Attorney, Agent, or Firm*—Hill, Steadman & Simpson

[57] ABSTRACT

A waste stream such as from an animal or poultry processing plant is mixed with bentonite or Grafted Bentonite and then with liquid Chitosan as natural flocculents to form a rigid floc which removes fats, oils, greases, and/or proteins from the waste stream. The flocculated solids (sludge) is removed and dried, and either formed into granules or pellets. The recovered material may be used as animal feed, when appropriate. However, it is particularly useful when mixed with coal fines and pelletized to form fuel pellets or used in granule form as a fuel source.

17 Claims, No Drawings

METHOD OF SOLIDS RECOVERY FOR USE IN ANIMAL FEED OR AS A FUEL UTILIZING NATURAL FLOCCULENTS

BACKGROUND OF THE INVENTION

1. Field of the Invention

The present invention relates generally to a method for recovery by flocculation of fats, oils, grease and/or proteins from a waste stream and to a method of using the recovered solid material (sludge) in animal feeds, as a fuel source or as a fertilizer.

2. Description of the Related Art

U.S. Pat. No. 4,548,615 relates to a process for manufacturing a solid fuel composition by admixing vegetable organic material with an oil-in-water macro-emulsion and drying the resultant composition. The oil of the emulsion is a hydrocarbon oil with oil droplets ranging from 0.5 to 20 micrometers. The resultant mixture is put in shape and dried. Emulsification of the hydrocarbon can be effected by passing a mixture of hydrocarbon, oil and an emulsifier through a suitable mixer. The heavy hydrocarbon oils used include any oil or coal derivative with an appropriate viscosity. The organic materials may originate from waste materials, cultivated energy-producing plants or natural fields. The waste materials include that from human or animal origin including combustible residues from the food-agriculture industry.

U.S. Pat. No. 4,744,903 relates to a process for facilitating the separation of fat from a waste stream composition comprising water, fat, fatty acids and solids produced in food processing plants and animal rendering plants. An alkaline pH control composition and an aluminum salt flocculent composition are added to the waste stream composition for subsequent separation in a clarifier of the waste stream composition into an essentially fatty layer, an essentially water layer, and an essentially solids layer. The pH control composition is a combination of a compound or a mixture of compounds. A flocculent composition, such as aluminum sulphate, alone or in combination with an enzyme such as protease, may also be used. These compositions are added to the waste water stream containing solids and inedible fats in amounts which are effective to provide an increase in fat separation from the waste stream. The skimming of the top layer of fat for selling as inedible tallow is contemplated.

U.S. Pat. No. 4,828,577 relates to a process for treating feed waste water from a food preparation plant to recover substantially all of its fats and up to fifty percent of its proteins in a chemical float sludge which is then selectively admixed with an absorptive bulking agent, such as sawdust. The resulting biomass mixture is dried to produce a biomass fuel for self-sustaining burning in a gasifier-type suspension burner. The admixing of a flocculation chemical, a solution of a coagulation chemical, and a stream of compressed air into the waste water stream are contemplated.

U.S. Pat. No. 4,906,386 relates to a flocculation of coal fines from an aqueous suspension by adding an anionic polyelectrolyte, a soluble calcium salt, and a cationic polyelectrolyte to the suspension.

U.S. Pat. No. 4,933,087 relates to a process for treating food waste waters by adding a specific composition to assist in coagulation and flocculation of the waste water. Sludges produced from the process are used in foods suitable for animal consumption.

U.S. Pat. No. 4,966,713 relates to a process for treating waste containing effluent water from a food processing plant. The effluent water is contacted with a flocculent comprising a crude algal composition or a crude alkali processed algal composition at an acidic pH. A floc containing substantially all of the solid waste components of the effluent water is formed as a result of the treatment process. The resultant floc can be recovered and used in animal feed stocks or in other products, such as fertilizers, or is disposed of in a landfill operation.

U.S. Pat. No. 5,015,391 relates to a method for treating emulsified oil contaminants in the waste water effluent of industrial and food processing operations. Cationic polymers and silicate ions coagulate oily particles in the waste water to facilitate removal from the water.

Limits on industrial process wastewater that is discharged into municipal sewage systems and sanitary districts are being imposed and fines levied against producers of industrial waste for exceeding the limits. Limits are placed on fats, oils and greases (FOG), biological oxygen demand (BOD), chemical oxygen demand (COD), and suspended solids (SS) in the waste stream. It is, therefore, important that the amounts of contaminants in the waste water emitted from a processing plant be controlled.

SUMMARY OF THE INVENTION

The present invention provides improved recovery of contaminants from waste streams using natural flocculents.

The invention also provides an approved end product for use as animal feed, particularly as a feed supplement.

According to yet another aspect of the invention, fuel granules or pellets are produced from two waste products.

The present invention relates generally to a method for recovery by flocculation of specific contaminant materials in a waste stream, such as a food or animal processing waste stream, to thereby reduce the contaminants in the waste stream for a cleaner water discharge to municipal sewage plants while remaining in compliance with NPDES (National Pollution Discharge Elimination System) discharge permit limits. The invention also provides the flocculated solids or thickened sludge as a usable product, such as animal feed or fertilizer. According to another aspect of the invention, the flocculated solids or thickened sludge can be combined with another waste product, such as coal fines, to form a usable end product, namely fuel granules or pellets.

The present method is used in waste streams of poultry, cattle or hog processing plants, cheese processing plants, grain processing, starch manufacturing, rice processing, lecithin wastewater, fruit or vegetable processing or soapstock recovery, or in any waste stream which contains fats, oils, greases, minerals and/or proteins suspended in a liquid. The method is applicable to waste streams having any combination of fats, oils, greases, minerals and/or proteins.

Natural flocculents are used, such as Western Bentonite and liquid Chitosan, or a more effective Chitosan grafted with Western Bentonite and liquid Chitosan, or liquid Chitosan alone. Bentonite is a plastic, colloidal, swelling clay which acts as an absorber or binder. Western Bentonite is a sodium bentonite which is available from, for example, Wyo-Ben, Inc. Chitosan is a high molecular weight, linear polymer made from chitin, which forms the structural component of the outer shells of crustaceans such as shrimp or crab. Thus, the Chitosan is itself derived from a waste product, crustacean shells. Chitosan is available from Eberhard von Huene and Associates, Vaudreuil (Quebec) Canada. Liquid Chitosan is obtained, for example, by dissolving powder flake Chitosan in acetic acid or glacial acetic acid. Chitosan-bentonite graph, also termed Grafted Bentonite, is manufactured by grafting bentonite to Chitosan using a process in which a mixture of bentonite and Chitosan are heated and then rapidly cooled. It is then converted to a powder by evaporation. It is believed that this causes a grafting of the silicate ions of the bentonite onto the Chitosan chain. This Grafted Bentonite, although a poor adsorber, provides an enhanced absorption quality for separation or flocculation and lends stability to the end product. The flocculents used in the present invention are natural and totally biodegradable, and are FDA (Food and Drug Administration) and AAFCO (Association of American Feed Control Officials) approved for recovery of solids or sludges containing fats, oils, grease, minerals, and or proteins for use in animal or poultry feeds.

According to one aspect of the present method, the flocculents are added separately to the waste stream containing fats, oils, grease, mineral and/or protein combinations. The waste steam and flocculents must be thoroughly mixed so that a homogeneous waste stream mixture is created. The Grafted Bentonite or bentonite creates a binding of fats, oils, and grease, then the subsequent addition of liquid Chitosan flocs the solids from the water which are removed using mechanical devices such as a cavitation floatation unit or dewatering belt press, or both. The liquid Chitosan may be used alone as the flocculent to serve as the binder and rigid floc former in some waste streams. However, in most applications, the best results have been obtained using the Grafted Bentonite added separately first, then a separate Chitosan addition to the waste stream for floc formation. This results in an enhanced absorbency and a rigid floc formation without usually requiring adjustment of the pH of the waste stream. No pH adjustment provides an additional benefit of the present treatment technique, namely operator safety. After thorough mixing, the main flocculent, the liquid Chitosan, is then added to flocculate the bentonite or Grafted Bentonite which was initially added to bind the oil, fat, grease and/or protein complex. A rigid floc that can be transferred for further mechanical or chemical/mechanical treatment is created from the treatment with Grafted Bentonite and liquid Chitosan. The resultant waters of the waste stream are cleaner and, thus, much cheaper to discharge than before the treatment.

The floc made up of the flocculating agents and the recovered oils, fats, grease, minerals and/or proteins, is then removed and can be dried by any number of drying techniques. When the waste stream contains acceptable recovered solids (sludge) that may be used in feed, the recovered solids (sludge) can be further processed in granular or pellet form to be used in animal or poultry feed. However, many times the solids (sludge material) have no by-product market for use in feeds and may, thus, sometimes become an environmental nuisance.

The present invention provides for use of these recovered but previously useless materials by mixing the material with coal fines. Coal fines are small particles and chips of coal that are found where coal is mined, transported or stored. It has been found that such coal fines have a lower sulfur content than the lump coal from which is originated. The flocculated material, which has been pelletized or processed into a granular form, is transported to the site of the coal fines, such as at a coal mine or an electrical power plant, and the blending combination of the flocculated material and the coal fines are performed there. The animal fat and coal fines are thoroughly mixed to form granules or pellets with a valuable BTU value which can be used as a fuel. The resulting fuel granules or pellets have a reduced sulfur content and provide a useful fuel source with a high BTU value created from combining two different waste products. The fuel granules or pellets can be made to be resistant to breakdown from moisture. The resultant fat-coal combination granule or pellet is particularly useful either in the fireplace market or in the electrical utility industry. When formed at the electric utility, the fuel granules or pellets need not be transported further but may be used on site.

An alternate possible use for the recovered material is as a fertilizer. This, of course, depends on the waste stream from which the material is recovered.

DESCRIPTION OF THE PREFERRED EMBODIMENTS

Plants for processing cattle, hogs, poultry or the like discharge a waste stream which usually contains fats, oils, grease, minerals, and/or proteins which become an environmental nuisance. The Environmental Protection Agency has proposed acceptable limits on industrial process waste water discharged into municipal sewer plants and/or sanitary districts. The present method provides for reducing the amount of these contaminants found in industrial waste waters and thereby assuring compliance with the water standards and helping to stop pollution of the water supply by using FDA and AAFCO approved natural flocculents for liquid-solid separation, and recovering the solids for use in feeds or fuel.

First, according to the preferred embodiment, Grafted Bentonite-Chitosan blend (which provides greater fat absorbency) or Western Bentonite alone is added to the waste stream and mixed thoroughly with the waste stream. The key is to mix the Grafted Bentonite well with the waste stream, preferably by prolonged, rapid agitation, to provide the necessary contact time required for the natural flocculents to properly absorb the fats, oils, greases and/or proteins into a homogeneous waste mixture. When the Grafted Bentonite is mixed into the waste stream, a superior binding action occurs by absorbing the complex fats, oils, grease, and protein matrix present in the waste water. This absorption increases the consistency of the waste stream to a thicker, homogeneous state from a heterogenous waste mixture which would cause inefficient absorbency of the main flocculent, liquid Chitosan. Although Western Bentonite provides absorbency, superior absorbency has only been achieved using Grafted Bentonite without a need to adjust the pH value of the waste material. A weak floc formation results after addition of Western Bentonite, whereas the Grafted Bentonite will provide a small, but stronger floc.

The waste stream material usually has a negative charge or an amphoteric charge, which gives the positively charged Western Bentonite or Grafted Bentonite a greater affinity to the waste material for an enhanced absorbing-binding capability.

It is generally preferred that the mixture be continuously agitated or rapidly mixed to enhance fat, oil, grease, mineral and/or protein binding, thus creating a thickened homogenous mixture and increasing the liquid density of the waste stream. However, if the proper or correct dose of flocculent is not consistently added to the process waste stream, a variation in the time required for the complete or enhanced absorption of the fat, oil, grease, mineral and/or proteins will result in possible loss of efficiency in solids or sludge recovery.

The liquid Chitosan is then added as the main flocculent and is mixed well with the waste material-bentonite mixture to enhance rigid floc formation of the bentonite. Extreme mixing of the liquid Chitosan with bentonite or the Grafted Bentonite and the process waste stream is critical to obtain a superior, rigid floc formation. Liquid Chitosan flocs the bound fat, oil, grease, mineral and/or protein matrix tightly together so that enhanced liquid-solid separation is achieved, resulting in a dryer more mechanically manageable solids material, commonly called sludge.

By adding liquid Chitosan at an optimum dose level required to flocculate the absorbed matrix created by the prior addition of the Grafted Bentonite, a rigid solids, or sludge is obtained which allows for an efficient removal or recovery of the fats, oils, grease, and/or proteins present in the waste stream. The dose level of each flocculent, or flocculating agent, is determined for each waste stream by conducting on-site jar testing and determining the results of each dose used verses the mixing time to obtain flocculation. Regardless of low or high dose of either flocculent, mixing time and rate of addition of each flocculent will determine degree of efficiency achieved in liquid-solid separation and solids (sludge) recovery.

In some waste streams, the liquid Chitosan alone will act as an absorbing binder and rigid floc former. This is because the structure of the Chitosan and its derived forms behave differently with different fats, oils, greases and proteins. Therefore, the step of mixing bentonite or Grafted Bentonite into the waste stream may be eliminated, simplifying the recovery process. As with the flocculent dosage determination, this is determined on a case-by-case basis.

Waste streams from which waste has been successfully recovered using Chitosan alone include corn wet milling, lecithin or soy waste, apple pulp waste, starches, corn or rice waste, protein recovery, algae floation and as a demulsifier for hydrocarbon or soapstock recovery. Chitosan alone has been found effective in approximately 20-30% of those waste streams in which it has been tried. However, the use of Chitosan with bentonite or Grafted Bentonite has been found effective in approximately 90% of the waste streams in which it has been tried. For example, Chitosan and Grafted Bentonite are effective for recovery of potato waste. The use of Chitosan in combination with other materials has also been found effective. Butterfat has successfully been recovered from a waste stream using an anionic polymer and Chitosan. Anionic alginates and Chitosan used together but fed separately to poultry waste provide flocculation and water clarification.

In many cases, the resulting solids (sludge) is a malleable, firm product which is easily removed from the waste stream, by use of mechanics, such as by skimming the floating material from off the top of the liquid in cavitation float units. The flocculated solids are mechanically floated to the top either through the use of diffused air floatation (cavitation) or dissolved air floatation, or a liquid-solid separation is accomplished using a dewatering belt press possibly preceded by a floatation step. The recovered material is then dried by any of a variety of drying methods to obtain granules or pellets.

The recovered solids (sludge) can be either granulated or pelletized to be used for animal feed, depending on the waste stream from which it is recovered. The natural flocculating agents used on the present method do not have the adverse side effects on the livestock and on the consumers of the livestock that many known flocculating agents have. The present method, thus, produces a safer end product to be used in animal feed which contains no known chemical toxins that can be entrapped in muscle tissue of hogs, poultry, and cattle to be consumed by humans.

However, some waste streams are not suitable for use as feed. Thus, an added market or use benefit has been found according to the present invention when the floc, either in granular or pellet form, is mixed with coal fines. Coal fines are the powdered and small particles of coal which accumulate at coal mines, coal processing locations, and at storage areas for coal fired power plants, for example. This material is a recoverable environmental nuisance which is not readily usable for burning in furnaces intended for lump coal, although it generally has a lower sulfur content than the coal from which it came, particularly for coal fines from soft bituminous coal.

Transportation of the pelletized or granulized floc to the coal mine or power plant eliminates the need to transport the coal fines. The fuel granules or pellets can then be burned for a high BTU value at the power plant at which they were formed. By mixing the coal fines in various ratios with the recovered solids, usually 70-73% coal fines to 27-30% fats, followed by mixing, extrusion, and/or pelletization, fat-coal fuel granules or pellets are created which may be used either in the fireplace market or the electrical utility industry. The formation of fuel pellets by this mixture has successfully been achieved by mixing 27% hog fat and protein with coal fines. The granules or pellets can be coated so that they do not absorb water as many other fuel pellets do and thus resist breaking apart while stockpiled. These pellets contain a relatively high BTU value. A further advantage is that the pellets usually have a lower sulphur content compared to the lump coal and so the utilization of the coal fines with the recovered solids (sludge) produces a fuel source lower in sulphur than the original coal.

Thus, a number of waste products are combined to create an environmentally friendly product, namely a low sulfur fuel granule or pellet. Removal of the waste products from the waste stream reduces the need for landfill space and for disposal and processing of the fats, oils, greases and/or proteins in the waste water, and thus eliminates unwanted solid material from the waste stream.

Although other modifications and changes may be suggested by those skilled in the art, it is the intention of the inventors to embody within the patent warranted hereon all changes and modifications as reasonably and properly come within the scope of their contribution to the art.

We claim:

1. A method for recovery of fats, oils, grease, minerals and/or protein from a waste stream, comprising the steps of:
   adding Chitosan and bentonite to the waste stream to form a mixture;
   thoroughly and rapidly agitating the mixture of Chitosan and bentonite and the waste stream so that a solid material of the Chitosan and fats, oils, grease, minerals and/or protein is formed in liquid of the waste stream, wherein said bentonite is added in an amount effective to adsorb said fats, oils, grease, minerals and/or protein and form an adsorbed matrix, and said Chitosan is added in an amount effective to flocculate said adsorbed matrix and form a rigid floc,
   removing the solid material including said rigid floc from the liquid of the waste stream.

2. A method as claimed in claim 1, wherein said bentonite is a grafted mixture of Chitosan and bentonite.

3. A method as claimed in claim 1, wherein the Chitosan is a liquid Chitosan in said step of adding.

4. A method as claimed in claim 1, wherein said step of adding comprises the substeps of:
   adding the bentonite to the waste stream; and then adding the Chitosan to the waste stream.

5. A method as claimed in claim 4, further comprising the substep of:
   thoroughly mixing the bentonite with the material of the waste stream after said step of adding the bentonite and before said step of adding the Chitosan.

6. A method as claimed in claim 1, wherein said step of removing includes separating the solid material from the liquid using a dewatering belt press.

7. A method as claimed in claim 1, wherein said step of removing includes aerating the Chitosan/waste stream mixture to cause floatation of the solid material in the liquid of the waste stream.

8. A method as claimed in claim 1, further comprising the steps of:
   mixing the solid material removed during said removing step with coal fines to form a coal/recovered waste mixture; and
   pelletizing or granularizing said coal/recovered waste mixture to form fuel pellets or granules.

9. A method as claimed in claim 1, further comprising the step of:
   using the solid material removed during said removing step as livestock feed.

10. A method as claimed in claim 1, further comprising the step of:
    using the solid material removed during said removing step as fertilizer.

11. A method for forming fuel pellets or granules, comprising the steps of:
    providing a waste stream containing oils, fats, grease, minerals and/or proteins suspended in a liquid;
    adding bentonite and Chitosan to said waste stream;
    vigorously mixing the Chitosan in the waste stream to form a rigid floc of at least semi-solid material, wherein said bentonite is added in an amount effective to adsorb said fats, oils, grease, minerals and/or protein and form an adsorbed matrix, and said Chitosan is added in an amount effective to flocculate said adsorbed matrix and form said rigid floc;
    removing the rigid floc from the liquid of the waste stream;
    mixing the rigid floc removed during said removing step with coal fines to form a coal/floc mixture; and
    forming the coal/floc mixture into fuel pellets or granules.

12. A method as claimed in claim 11, further comprising the step of:
    adding bentonite to said waste stream before said step of adding Chitosan.

13. A method as claimed in claim 12, further comprising the steps of:
    rapidly mixing said waste stream with said bentonite after said step of adding bentonite and prior to said step of adding Chitosan.

14. A method as claimed in claim 12, wherein said bentonite is a grafted mixture of Western Bentonite and Chitosan.

15. A method as claimed in claim 11, further comprising the step of:
    drying said rigid floc after said step of removing.

16. A method as claimed in claim 11, wherein said Chitosan added in said step of adding is liquid Chitosan.

17. A method for recovering fats, oils, grease, minerals and/or protein from a waste stream, comprising the steps of:
    providing a waste stream containing oils, fats, grease, minerals and/or proteins suspended in a liquid;
    adding a grafted mixture of Western Bentonite and Chitosan to the waste stream to form a mixture;
    thoroughly and rapidly agitating the mixture of Western Bentonite and Chitosan and said waste stream;
    adding liquid Chitosan to said waste stream;
    thoroughly and rapidly agitating said liquid Chitosan and said waste stream so that a solid material of the liquid Chitosan and the fats, oils, grease, minerals and/or protein is formed in the liquid of the waste stream, wherein said grafted mixture is added in an amount effective to adsorb said fats, oils, grease, minerals and/or protein and form an adsorbed matrix, and said liquid Chitosan is added in an amount effective to flocculate said adsorbed matrix and form a rigid floc;
    removing the solid material including said rigid floc from the liquid of the waste stream; and
    mixing the solid material removed during said removing step with coal fines to form a fuel mixture.

* * * * *